(12) United States Patent
Watanabe et al.

(10) Patent No.: US 6,966,850 B2
(45) Date of Patent: Nov. 22, 2005

(54) TWO-PIECE SOLID GOLF BALL

(75) Inventors: Hideo Watanabe, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 102 days.

(21) Appl. No.: 10/151,107

(22) Filed: May 21, 2002

(65) Prior Publication Data

US 2003/0027666 A1 Feb. 6, 2003

(30) Foreign Application Priority Data

Jun. 25, 2001 (JP) .................................. 2001-190887

(51) Int. Cl.⁷ .............................................. A63B 37/06
(52) U.S. Cl. ...................................................... 473/377
(58) Field of Search ................................ 473/351, 367, 473/368, 376, 377, 378

(56) References Cited

U.S. PATENT DOCUMENTS

| | | | | |
|---|---|---|---|---|
| 5,252,652 A | * | 10/1993 | Egashira et al. | 524/392 |
| 5,585,152 A | * | 12/1996 | Tamura et al. | 428/35.1 |
| 5,711,723 A | * | 1/1998 | Hiraoka et al. | 473/374 |
| 5,776,012 A | * | 7/1998 | Moriyama et al. | 473/372 |
| 5,929,171 A | * | 7/1999 | Sano et al. | 525/261 |
| 6,287,218 B1 | * | 9/2001 | Ohama | 473/377 |
| 6,486,261 B1 | * | 11/2002 | Wu et al. | 525/332.6 |

FOREIGN PATENT DOCUMENTS

| | | |
|---|---|---|
| JP | 05123422 A | 5/1993 |
| JP | 06154357 A | 6/1994 |
| JP | 09215778 A | 8/1997 |

* cited by examiner

*Primary Examiner*—Raeann Gorden
(74) *Attorney, Agent, or Firm*—Sughrue Mion, PLLC

(57) ABSTRACT

Disclosed is a two-piece solid golf ball satisfying the following conditions (1) to (4):
(1) an outer cover predominantly contains a polyurethane material;
(2) the outer cover has a thickness of 2.15 to 2.9 mm;
(3) a core is formed from a rubber material; and
(4) JIS C hardness as measured at any portion of the core is 58 to 87.

The golf ball provides excellent feeling on impact and controllability, exhibits excellent cut resistance, scuff resistance, and durability against cracking caused by repeated hitting, and is suitable for use by advanced golfers on golf practice ranges.

2 Claims, 1 Drawing Sheet

TWO-PIECE SOLID GOLF BALL

BACKGROUND OF THE INVENTION

1. Field of the Invention

The present invention relates to a two-piece solid golf ball having a cover formed from a polyurethane material; and more particularly to a golf ball which provides a satisfactory feeling on impact and excellent controllability, which exhibits excellent cut resistance (i.e., durability when topped with an iron), scuff resistance, and durability against cracking caused by repeated hitting, and which is suitable for use by advanced golfers on golf practice ranges.

2. Description of the Related Art

Conventionally, in many cases, one-piece balls have been used on golf practice ranges (hereinafter the expression "balls used on golf practice ranges" will be simplified to "practice golf balls"). However, the total distance of one-piece balls is considerably shorter than that of course balls (i.e., balls used on golf courses). Therefore, when golfers practice with one-piece balls, they cannot acquire an accurate distance sensation that they would acquire in actual games in which course balls are used. One-piece balls are produced from a rubber material cross-linked with zinc methacrylate in order to impart high durability to the balls. However, since the one-piece balls produced from the rubber material exhibit low restitution, their total distance is short.

Conventionally, some two-piece balls have also been used as practice golf balls. However, such practice two-piece golf balls do not meet demands from advanced golfers and professional golfers in terms of controllability (spin performance), although the golf balls exhibit excellent flight performance and provide good feeling on impact. Meanwhile, since the practice two-piece golf balls exhibit poor scuff resistance, the frequency of exchange of the balls is increased. Therefore, from the viewpoint of costs, the practice two-piece golf balls do not meet demands from golf practice range owners.

In order to solve such problems, Japanese Patent Application Laid-Open (kokai) No. 9-215778 discloses a two-piece solid golf ball having a cover formed from a polyurethane material. However, in this golf ball, the thickness of the cover is not appropriate, the restitution of the core is insufficient, and the scuff resistance of the resin used for forming the cover is unsatisfactory. Therefore, the golf ball is not satisfactory as a practice golf ball for advanced golfers.

Meanwhile, Japanese Patent Application Laid-Open (kokai) No. 5-123422 or 6-154357 discloses a two-piece solid golf ball having a thick cover. However, in this golf ball, since the cover is formed from an ionomer resin, the cover is hard, and the scuff resistance of the cover is poor. Therefore, the golf ball does not satisfy advanced golfers in terms of controllability, and does not exhibit sufficient durability required for practice balls.

In order to solve problems involved in the aforementioned conventional golf balls, the present invention provides a golf ball which exhibits controllability (spin performance) comparable to that of a spin-type course ball—although the flight performance is inferior to that of a course ball—which exhibits excellent durability as compared with a course ball, and which is suitable for use by advanced golfers on golf practice ranges.

SUMMARY OF THE INVENTION

In view of the foregoing, an object of the present invention is to provide a two-piece solid golf ball which provides an excellent feeling on impact and controllability (spin performance) satisfying advanced golfers and professional golfers, which exhibits excellent cut resistance, scuff resistance, and durability against cracking caused by repeated hitting, and which is suitable for use by advanced golfers on golf practice ranges.

The present inventors have performed extensive studies, and have found that the above object can be effectively achieved by forming a cover from a polyurethane material, regulating the thickness of the cover within a predetermined range, and appropriately determining the hardness of any portion of a core.

The present invention has been accomplished on the basis of this finding. Accordingly, the present invention provides a two-piece solid golf ball comprising a solid core and an outer cover therefor, wherein the outer cover predominantly contains a polyurethane material and has a thickness of 2.15 to 2.9 mm, the solid core is formed from a rubber material, and JIS C hardness as measured at any portion of the core is 58 to 87.

DESCRIPTION OF THE INVENTION AND PREFERRED EMBODIMENTS

Figure 1:
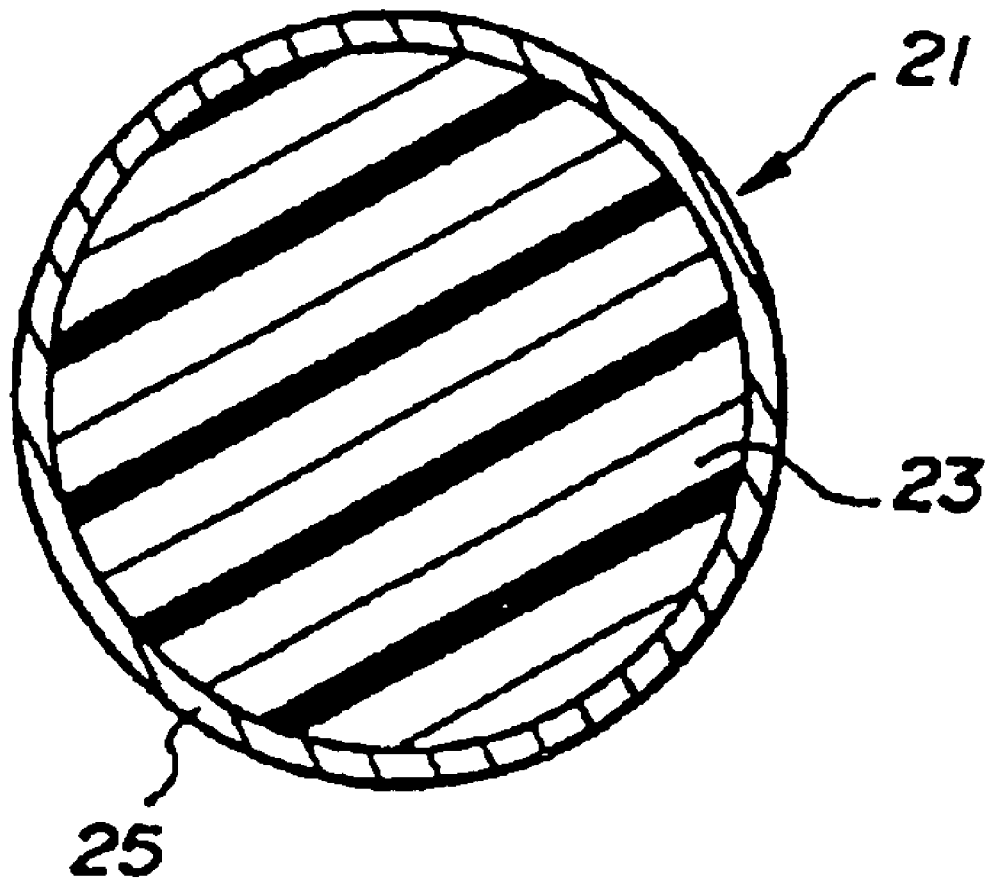
FIG. 1 is a cross section of a two-piece golf ball.

The present invention as shown in FIG. 1 will next be described in detail. Firstly the outer cover 25 of the golf ball 21 of the present invention will be described. Since the outer cover 25 predominantly contains a polyurethane material, the golf ball 21 exhibits excellent feeling on impact, controllability, cut resistance, scuff resistance, and durability against cracking caused by repeated hitting, with restitution being maintained.

Preferably, the outer cover is formed from a cover-forming material (C) predominantly containing the following components (A) and (B):

(A) a thermoplastic polyurethane material, and (B) an isocyanate mixture in which an isocyanate compound (b-1) having at least two isocyanate groups serving as functional groups in the molecule is dispersed in a thermoplastic resin (b-2) which is substantially non-reactive with the isocyanate groups.

In the present invention, when the outer cover is formed from the aforementioned cover-forming material (C), the resultant golf ball exhibits more excellent feeling on impact, controllability, cut resistance, scuff resistance, and durability against cracking caused by repeated hitting.

The aforementioned components (A) to (C) will next be described.

(A) Thermoplastic Polyurethane Material

The thermoplastic polyurethane material includes soft segments formed of a polymeric polyol (polymeric glycol), a chain extender constituting hard segments, and a diisocyanate. No particular limitation is imposed on the polymeric polyol serving as a raw material, and the polymeric polyol may be any one selected from polymeric polyols which are conventionally employed in the technical field related to thermoplastic polyurethane materials. Examples of the polymeric polyol include polyester polyols and polyether polyols. Of these, polyether polyols are more preferred to polyester polyols, since a thermoplastic polyurethane material having high restitution elastic modulus and exhibiting excellent low-temperature properties can be synthesized. Examples of the polyether polyols include polytetramethylene glycol and polypropylene glycol. From the viewpoints of restitution elastic modulus and low-temperature property, polytetramethylene glycol is particularly preferred. The average molecular weight of the polymeric polyol is preferably 1,000 to 5,000. The average molecular weight is more preferably 2,000 to 4,000, in order to synthesize a thermoplastic polyurethane material having high restitution elastic modulus.

Any chain extender which is conventionally employed in the technical field related to thermoplastic polyurethane materials is preferably used. Examples of the chain extender include, but are not limited to, 1,4-butylene glycol, 1,2-ethylene glycol, 1,3-butanediol, 1,6-hexanediol, and 2,2-dimethyl-1,3-propanediol. The average molecular weight of the chain extender is preferably 20 to 15,000.

Any diisocyanate which is conventionally employed in the technical field related to thermoplastic polyurethane materials is preferably used. Examples of the diisocyanate include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Some diisocyanates involve difficulty in controlling cross-linking reaction during injection molding. In the present invention, 4,4'-diphenylmethane diisocyanate, which is an aromatic diisocyanate, is most preferred, in consideration of stability in reaction with the below-described isocyanate mixture (B).

Preferred examples of the thermoplastic polyurethane material containing the aforementioned materials include commercially available polyurethane materials, such as Pandex T-8290, T-8295, and T-8260 (products of DIC Bayer Polymer Ltd.), and Resamine 2593 and 2597 (products of Dainichiseika Color & Chemicals Mfg. Co., Ltd.).

(B) Isocyanate Mixture

The isocyanate mixture (B) is obtained by dispersing the isocyanate compound (b-1) having at least two isocyanate groups serving as functional groups in the molecule in the thermoplastic resin (b-2) which is substantially non-reactive with the isocyanate groups. The aforementioned isocyanate compound (b-1) is preferably an isocyanate compound which is conventionally employed in the technical field related to thermoplastic polyurethane materials. Examples of the isocyanate compound include, but are not limited to, aromatic diisocyanates such as 4,4'-diphenylmethane diisocyanate, 2,4-toluene diisocyanate, and 2,6-toluene diisocyanate; and aliphatic diisocyanates such as hexamethylene diisocyanate. Of these, 4,4'-diphenylmethane diisocyanate is most preferred, in consideration of reactivity and operational safety.

The aforementioned thermoplastic resin (b-2) is preferably a resin having low water-absorbability and high compatibility with the thermoplastic polyurethane material. Examples of the resin include polystyrene resins, polyvinyl chloride resins, ABS resins, polycarbonate resins, and polyester elastomers (e.g., polyether-ester block copolymers and polyester-ester block copolymers). Of these, in consideration of restitution elasticity and strength, polyester elastomers are preferred, and among them polyether-ester block copolymers are particularly preferred.

In the isocyanate mixture (B), the ratio by weight of the thermoplastic resin (b-2) to the isocyanate compound (b-1) is preferably 100:5 to 100:100, more preferably 100:10 to 100:40. When the ratio of the isocyanate compound (b-1) to the thermoplastic resin (b-2) is excessively low, a large amount of the isocyanate mixture (B) must be added to the thermoplastic polyurethane material (A), in order to achieve a successful cross-linking reaction between the isocyanate compound (b-1) and the thermoplastic polyurethane material (A). As a result, the thermoplastic resin (b-2) greatly affects the thermoplastic polyurethane material (A), resulting in unsatisfactory properties of the cover-forming material (C). In contrast, when the ratio of the isocyanate compound (b-1) to the thermoplastic resin (b-2) is excessively high, thorough and satisfactory kneading of the isocyanate compound (b-1) into the thermoplastic resin (b-2) is not attained, and thus preparation of the isocyanate mixture (B) becomes difficult.

The isocyanate mixture (B) can be obtained through, for example, the following procedure: the isocyanate compound (b-1) is incorporated into the thermoplastic resin (b-2), and the resultant mixture is kneaded well by use of a mixing roll or a banbury mixer at 130 to 250° C., followed by pelletization or pulverization after cooling. Preferred examples of the isocyanate mixture (B) include commercially available isocyanate mixtures such as Crossnate EM30 (product of Dainichiseika Color & Chemicals Mfg. Co., Ltd.).

(C) Cover-forming Material

The cover-forming material (C) predominantly contains the aforementioned thermoplastic polyurethane material (A) and isocyanate mixture (B). In the cover-forming material (C), the ratio by weight of the thermoplastic polyurethane material (A) to the isocyanate mixture (B) is preferably 100:1 to 100:100, more preferably 100:5 to 100:50, much more preferably 100:10 to 100:30. When the ratio of the isocyanate mixture (B) to the thermoplastic polyurethane material (A) is excessively low, the isocyanate mixture (B) exerts insufficient cross-linking effect, whereas when the ratio is excessively high, unreacted isocyanate imparts a color to the resultant cover-forming material.

The cover-forming material (C) may contain other components in addition to the aforementioned components. Examples of such "other components" include thermoplastic polymer materials other than the thermoplastic polyurethane material, such as polyester elastomer, polyamide elastomer, ionomer resin, styrene block elastomer, polyethylene, and nylon resin. In this case, the incorporation amount of thermoplastic polymer materials other than the thermoplastic polyurethane material is 0 to 100 parts by weight, preferably 10 to 75 parts by weight, more preferably 10 to 50 parts by weight, on the basis of 100 parts by weight of the thermoplastic polyurethane material which serves as an essential component. The incorporation amount is appropriately determined in accordance with various purposes, including regulation of the hardness of the cover-forming material and improvement of the restitution, fluidity, and adhesion of the cover-forming material. If desired, the cover-forming material (C) may further contain various additives, such as pigments, dispersants, antioxidants, light-resistant stabilizers, UV absorbers, and release agents.

A cover can be formed from the cover-forming material (C) through, for example, the following procedure: the thermoplastic polyurethane material (A) is added to the isocyanate mixture (B) and then dry-mixed, and the resultant mixture is subjected to injection molding, to thereby form a cover around a core. The molding temperature varies with the type of the thermoplastic polyurethane material (A), but is typically 150 to 250° C.

In the resultant golf ball cover, reaction or cross-linking is thought to proceed as follows: an isocyanate group is reacted with a residual OH group of the thermoplastic polyurethane material, to thereby form a urethane bond; or an isocyanate group is added to a urethane group of the thermoplastic polyurethane material, to thereby form an allophanate or biuret cross-linking structure. In this case, although cross-linking proceeds insufficiently immediately after injection molding of the cover-forming material (C), cross-linking proceeds through annealing after injection molding, and the resultant golf ball cover is endowed with useful properties. As used herein, the term "annealing" refers to aging through heating at a certain temperature for a predetermined period of time, or aging at room temperature for a predetermined period of time.

In the golf ball of the present invention, the thickness of the outer cover is preferably 2.15 to 2.9 mm, more preferably 2.2 to 2.7 mm, much more preferably 2.3 to 2.5 mm. When the cover is excessively thin, cut resistance and durability against cracking caused by repeated hitting may be deteriorated. In contrast, when the cover is excessively thick, restitution of the golf ball may be lowered, and the total distance of the golf ball may become insufficient even when the golf ball is used as a practice golf ball.

In the golf ball of the present invention, the JIS C hardness of the outer cover is preferably 63 to 90, more preferably 68 to 87, much more preferably 73 to 85. When the cover is excessively soft, the total distance of the golf ball may become insufficient even when the golf ball is used as a practice golf ball. In contrast, when the cover is excessively hard, impact resistance of the golf ball may be lowered, resulting in deterioration of durability against cracking caused by repeated hitting.

The solid core 23 will next be described. The solid core 23 of the golf ball 21 of the present invention is formed from a rubber material. No particular limitation is imposed on the base rubber of the aforementioned rubber material, and the base rubber may be any base rubber which is generally used in a core. The base rubber is preferably polybutadiene, more preferably cis-1,4-polybutadiene in which cis segments account for at least 40%. If desired, the base rubber may contain, in addition to polybutadiene, other rubber components such as natural rubber, polyisoprene rubber, and styrene-butadiene rubber.

In the aforementioned rubber material, preferably, an organic sulfur compound is incorporated into the base rubber, in order to impart excellent restitution to the resultant golf ball. When an organic sulfur compound is not incorporated into the base rubber, restitution of the golf ball may be lowered, and the total distance of the golf ball may become insufficient even when the golf ball is used as a practice golf ball. Preferred examples of the organic sulfur compound include thiophenol, thionaphthol, halogenated thiophenol, and metallic salts thereof Specific examples include zinc salts of pentachlorothiophenol, pentafluorothiophenol, pentabromothiophenol, parachlorothiophenol, and pentachlorothiophenol; S2–S4 diphenyl polysulfides; S2–S4 dibenzyl polysulfides; S2–S4 dibenzoyl polysulfides; S2–S4 dibenzothiazoyl polysulfides; and S2–S4 dithiobenzoyl polysulfides. Of these, a zinc salt of pentachlorothiophenol or diphenyl disulfide is particularly preferred.

In the aforementioned rubber material, the incorporation amount of the organic sulfur compound is typically at least 0.05 parts by weight, preferably at least 0.1 parts by weight, more preferably at least 0.2 parts by weight, on the basis of 100 parts by weight of the base rubber. When the incorporation amount of the organic sulfur compound is excessively low, improvement of restitution of the golf ball is not envisaged. The upper limit of the incorporation amount of the organic sulfur compound is typically 2.0 parts by weight or less, preferably 1.2 parts by weight or less, more preferably 1.0 part by weight or less, on the basis of 100 parts by weight of the base rubber. When the incorporation amount of the organic sulfur compound is excessively high, further improvement of restitution of the golf ball (particularly restitution of the golf ball upon being hit with a driver) is not envisaged, and the core of the golf ball may become very soft and feeling on impact may be impaired.

In the golf ball of the present invention, JIS C hardness as measured at any portion of the core is preferably 58 to 87, more preferably 60 to 85, much more preferably 62 to 83. The expression "any portion of the core" refers to any portion of the entirety of the core, including the center and surface of the core. When the hardness as measured at any portion of the core falls below the above range, feeling on impact may become too soft, and durability against cracking caused by repeated hitting may be impaired. In contrast, when the hardness as measured at any portion of the core exceeds the above range, shot on impact may become too strong, and the golf ball may spin excessively upon full shot. As a result, the ball is "skyed" and follows a trajectory which greatly differs from that of a course ball.

In the golf ball of the present invention, preferably, the JIS C hardness of the surface portion of the core is higher than that of the center portion of the core. In addition, the value obtained through subtraction of the JIS C hardness of the center portion of the core from the JIS C hardness of the surface portion of the core is preferably 20 or less, more preferably 16 or less, much more preferably 10 or less. When the subtraction value is excessively small, the golf ball may spin excessively upon full shot. As a result, the ball is "skyed" and follows a trajectory which greatly differs from that of a course ball. In contrast, when the subtraction value is excessively large, restitution of the golf ball may be lowered, and the total distance of the golf ball may become insufficient even when the golf ball is used as a practice golf ball. Furthermore, durability against cracking caused by repeated hitting may be deteriorated.

The golf ball of the present invention is formed so as to have a diameter and a weight as specified under the Rules of Golf approved by R&A. Typically, the diameter is at least 42.67 mm, and the weight is 45.93 g or less. The diameter is preferably 42.67 to 42.9 mm. The deformation amount of the golf ball under application of a load of 980 N (100 kg) is preferably 2.0 to 4.0 mm, more preferably 2.2 to 3.8 mm.

EXAMPLES

The present invention will next be described in detail by way of Examples, which should not be construed as limiting the invention thereto.

Examples and Comparative Examples

The components of the core composition shown in Tables 1 through 3 (unit: part(s) by weight) were kneaded, and then vulcanized under the conditions shown in Tables 1 through 3, to thereby yield solid cores for two-piece solid golf balls. Components of the core compositions shown in Tables 1 through 3 are as follows.

Polybutadiene Rubber (1)
  BR11 product of Japan Synthetic Rubber Co., Ltd.)
Polybutadiene Rubber (2)
  BR18 (product of Japan Synthetic Rubber Co., Ltd.)
Peroxide (1)
  Dicumyl peroxide: Percumyl D (product of Nippon Oil & Fats Co., Ltd.)
Peroxide (2)
  1,1-bis(t-butylperoxy)-3,3,5-trimethylcyclohexane: Perhexa 3M-40 (product of Nippon Oil & Fats Co., Ltd.)

Antioxidant
   Nocrac NS-6 (product of Ouchi Shinko Chemical Industrial Co., Ltd.)

Cover compositions shown in Table 4 (unit: part(s) by weight) were kneaded at a predetermined temperature, to thereby obtain cover-forming materials. Components of the cover compositions shown in Table 4 are as follows.

Polyurethane 1 (Thermoplastic Polyurethane Material)
   Pandex T8295: MDI-PTMG-type thermoplastic polyurethane material (product of DIC Bayer Polymer Ltd.) (JIS A surface hardness: 97, restitution elastic modulus: 44%)

Ionomer Resin 1
   Himilan 1557 (product of DuPont-Mitsui Polychemicals Co., Ltd.)

Ionomer Resin 2
   Himilan 1855 (product of DuPont-Mitsui Polychemicals Co., Ltd.)

Ionomer Resin 3
   Surlyn 8120 (product of DuPont)

Copolymer 1
   Nucrel AN4311 (product of DuPont-Mitsui Polychemicals Co., Ltd.)

Isocyanate Mixture
   Crossnate EM30: Isocyanate master batch (product of Dainichiseika Color & Chemicals Mfg. Co., Ltd.) containing 30% 4,4'-diphenylmethane diisocyanate (isocyanate concentration as measured through amine back titration according to JIS-K1556: 5–10%, master batch base resin: polyester elastomer) (4,4'-diphenylmethane diisocyanate corresponds to the isocyanate compound (b-1), and the polyester elastomer corresponds to the thermoplastic resin (b-2))

Subsequently, each of the aforementioned solid cores was placed in a die for injection molding, and a cover was formed from each of the cover materials around the core by means of injection molding, to thereby produce a two-piece solid golf ball (Examples 1 through 4 and Comparative Examples 1 through 5). In Comparative Example 6, a commercially available practice one-piece golf ball was employed. In Comparative Example 7, a commercially available practice two-piece golf ball was employed. Thereafter, properties of the resultant golf balls were evaluated. The evaluation methods are described below. Cover properties were measured by use of a sheet (thickness: 2 mm) formed through injection molding. The results are shown in Tables 1 through 3.

Flight Performance
   The golf ball was hit at a head speed (HS) of 45 m/s by use of a driver (W #1) mounted on a swing robot, to thereby measure a total distance. The total distance was evaluated on the basis of the following criteria.
   O: Total distance is 220 m or more
   x: Total distance is 219 m or less Controllability
   The golf ball was hit at a head speed (HS) of 20 m/s by use of a sand wedge (SW) mounted on a swing robot, to thereby measure a spin rate. Evaluation of the spin rate (approach spin evaluation) was performed on the basis of the following criteria.
   O: Spin rate is 5,700 rpm or more
   x: Spin rate is less than 5,500 rpm Feeling
   Three professional golfers hit the golf balls by use of a driver (W #1), and evaluated their feelings on impact on the basis of the following criteria.
   O: Good
   x: Too strong or too soft Durability Against Cracking (Durability Against Cracking Caused by Repeated Hitting)
   In order to evaluate durability against cracking caused by repeated hitting, the golf ball was hit repeatedly, and the number of hits counted when the initial velocity decreased by a certain amount was employed as an index. Specifically, the golf ball was hit repeatedly at a head speed of 50 m/s by use of a driver (W #1) mounted on a swing robot, and the number of hits (n) counted when the initial velocity at the (n+1)-th hit decreases by 2% from that at the n-th hit was measured. The actual number of hits of the golf ball of Example 4 after which the initial velocity decreased in the aforementioned manner was taken as 100, and durability against cracking was evaluated on the basis of the following criteria.
   O: 100 or more
   x: 97 or less Scuff Resistance
   The golf ball was hit at a head speed of 45 m/s by use of a pitching wedge (V-groove type) mounted on a swing robot machine. Thereafter, the condition of the resultant golf ball was visually evaluated on the basis of the following criteria.
   O: Still usable
   x: Not usable Cut Resistance (Durability when Topped with an Iron)
   An arbitrary portion of the golf ball was topped repeatedly at a head speed of 45 m/s by use of a pitching wedge mounted on a swing robot machine. Thereafter, the condition of the resultant golf ball was visually evaluated, and the number of hits until the ball was judged to be unusable was counted. The actual number of hits until the golf ball of Example 2 was judged to be unusable was taken as 100, and cut resistance was evaluated on the basis of the following criteria.
   O: 95 or more
   x: 90 or less

TABLE 1

|  |  | Ex. 1 | Ex. 2 | Ex. 3 | Ex. 4 |
|---|---|---|---|---|---|
| Solid core | Outer diameter (mm) | 37.9 | 38.1 | 37.7 | 38.1 |
|  | Weight (g) | 31.8 | 32.3 | 31.3 | 32.3 |
|  | Surface JIS C hardness (A) | 80 | 78 | 80 | 81 |
|  | Center JIS C hardness (B) | 75 | 71 | 75 | 66 |
|  | (A) - (B) | 5 | 7 | 5 | 15 |
| Outer cover | Composition | (1) | (1) | (1) | (1) |
|  | JIS C hardness | 77 | 77 | 77 | 77 |
|  | Thickness (mm) | 2.4 | 2.3 | 2.5 | 2.3 |

TABLE 1-continued

| | | | Ex. 1 | Ex. 2 | Ex. 3 | Ex. 4 |
|---|---|---|---|---|---|---|
| Ball | Outer diameter (mm) | | 42.7 | 42.7 | 42.7 | 42.7 |
| | Weight (g) | | 45.3 | 45.3 | 45.3 | 45.3 |
| Core composition 0 (part(s) by weight) | Polybutadiene rubber (1) | | 70 | 70 | 70 | 70 |
| | Polybutadiene rubber (2) | | 30 | 30 | 30 | 30 |
| | Zinc acrylate | | 34.7 | 30.4 | 32.2 | 31.5 |
| | Peroxide (1) | | 0.6 | 0.6 | 0.6 | 0.6 |
| | Peroxide (2) | | 0.6 | 0.6 | 0.6 | 0.6 |
| | Antioxidant | | 0.2 | 0.2 | 0.2 | 0.2 |
| | Zinc oxide | | 10.1 | 12.0 | 11.2 | 12.2 |
| | Pentachlorothiophenol zinc salt | | 1.0 | 1.0 | 1.0 | 1.0 |
| | Zinc stearate | | 0 | 0 | 0 | 5 |
| Vulcanization | First Step | Temperature | 145° C. | 145° C. | 145° C. | 155° C. |
| | | Time | 30 min | 30 min | 30 min | 15 min |
| | Second Step | Temperature | 170° C. | 170° C. | 170° C. | — |
| | | Time | 10 min | 10 min | 10 min | — |
| Flight performance | W#1 | Carry (m) | 211.0 | 209.6 | 210.1 | 208.8 |
| | HS45 | Total (m) | 224.9 | 226.1 | 225.8 | 225.5 |
| | Total distance evaluation | | ○ | ○ | ○ | ○ |
| Controllability | SW HS20 | Spin (rpm) | 5810 | 5819 | 5805 | 5829 |
| | Approach spin evaluation | | ○ | ○ | ○ | ○ |
| Feeling | W#1 | | ○ | ○ | ○ | ○ |
| Durability | Durability against cracking | | ○ | ○ | ○ | ○ |
| | Scuff resistance | | ○ | ○ | ○ | ○ |
| | Cut resistance | | ○ | ○ | ○ | ○ |

TABLE 2

| | | | Comp. Ex. 1 | Comp. Ex. 2 | Comp. Ex. 3 | Comp. Ex. 4 |
|---|---|---|---|---|---|---|
| Solid core | Outer diameter (mm) | | 39.3 | 36.7 | 38.3 | 37.7 |
| | Weight (g) | | 35.4 | 28.9 | 32.8 | 32.9 |
| | Surface JIS C hardness (A) | | 78 | 78 | 89 | 78 |
| | Center JIS C hardness (B) | | 71 | 71 | 68 | 71 |
| | (A) - (B) | | 7 | 7 | 21 | 7 |
| Outer cover | Composition | | (1) | (1) | (1) | (2) |
| | JIS C hardness | | 77 | 77 | 77 | 77 |
| | Thickness (mm) | | 1.7 | 3.0 | 2.2 | 2.5 |
| Ball | Outer diameter (mm) | | 42.7 | 42.7 | 42.7 | 42.7 |
| | Weight (g) | | 45.3 | 45.3 | 45.3 | 45.3 |
| Core composition (part(s) by weight) | Polybutadiene rubber (1) | | 70 | 70 | 70 | 70 |
| | Polybutadiene rubber (2) | | 30 | 30 | 30 | 30 |
| | Zinc acrylate | | 30.4 | 30.4 | 40.0 | 30.4 |
| | Peroxide (1) | | 0.6 | 0.6 | 0.6 | 0.6 |
| | Peroxide (2) | | 0.6 | 0.6 | 0.6 | 0.6 |
| | Antioxidant | | 0.2 | 0.2 | 0.2 | 0.2 |
| | Zinc oxide | | 11.9 | 12.2 | 8.4 | 21.3 |
| | Pentachlorothiophenol zinc salt | | 1.0 | 1.0 | 1.0 | 1.0 |
| | Zinc stearate | | 0 | 0 | 5 | 0 |
| Vulcanization | First Step | Temperature | 145° C. | 145° C. | 157° C. | 145° C. |
| | | Time | 30 min | 30 min | 15 min | 30 min |
| | Second Step | Temperature | 170° C. | 170° C. | — | 170° C. |
| | | Time | 10 min | 10 min | — | 10 min |
| Flight performance | W#1 | Carry (m) | 213.2 | 203.6 | 212.9 | 209.1 |
| | HS45 | Total (m) | 228.2 | 218.5 | 228.0 | 224.7 |
| | Total distance evaluation | | ○ | x | ○ | ○ |
| Controllability | SW HS20 | Spin (rpm) | 5820 | 5832 | 5788 | 5682 |
| | Approach spin evaluation | | ○ | ○ | ○ | ○ |
| Feeling | W#1 | | ○ | ○ | x | ○ |
| Durability | Durability against cracking | | ○ | ○ | ○ | ○ |
| | Scuff resistance | | ○ | ○ | ○ | x |
| | Cut resistance | | x | ○ | ○ | ○ |

TABLE 3

|  | Comp. Ex. 5 | Comp. Ex. 6 | Comp. Ex. 7 |
|---|---|---|---|
| Solid core |  |  |  |
| Outer diameter (mm) | 38.1 | Commercially available practice one-piece golf ball | Commercially available practice two-piece golf ball |
| Weight (g) | 32.3 |  |  |
| Surface JIS C hardness (A) | 65 |  |  |
| Center JIS C hardness (B) | 57 |  |  |
| (A)–(B) | 12 |  |  |
| Outer cover |  |  |  |
| Composition | (1) | — | — |
| JIS C hardness | 77 | — | — |
| Thickness (mm) | 2.3 | — | — |
| Ball |  |  |  |
| Outer diameter (mm) | 42.7 | 42.6 | 42.8 |
| Weight (g) | 45.3 | 45.5 | 45.5 |
| Core composition (part(s) by weight) |  |  |  |
| Polybutadiene rubber (1) | 70 | — | — |
| Polybutadiene rubber (2) | 30 | — | — |
| Zinc acrylate | 22.0 | — | — |
| Peroxide (1) | 0.6 | — | — |
| Peroxide (2) | 0.6 | — | — |
| Antioxidant | 0.2 | — | — |
| Zinc oxide | 16.3 | — | — |
| Pentachlorothiophenol zinc salt | 1.0 | — | — |
| Zinc stearate | 5 | — | — |
| Vulcanization |  |  |  |
| First Step |  |  |  |
| Temperature | 155° C. | — | — |
| Time | 15 min | — | — |
| Second Step |  |  |  |
| Temperature | — | — | — |
| Time | — | — | — |
| Flight performance |  |  |  |
| W#1 HS45 |  |  |  |
| Carry (m) | 205.5 | 195.4 | 212.1 |
| Total (m) | 222.8 | 211.1 | 225.0 |
| Total distance evaluation | O | x | O |
| Controllability |  |  |  |
| SW HS20 |  |  |  |
| Spin (rpm) | 5850 | 6750 | 5230 |
| Approach spin evaluation | O | O | x |
| Feeling |  |  |  |
| W#1 | x | O | O |
| Durability |  |  |  |
| Durability against cracking | x | O | x |
| Scuff resistance | O | O | x |
| Cut resistance | O | O | O |

TABLE 4

|  | (1) | (2) |
|---|---|---|
| Polyurethane 1 | 100 | — |
| Ionomer resin 1 | — | 20 |
| Ionomer resin 2 | — | 30 |
| Ionomer resin 3 | — | 30 |
| Copolymer 1 | — | 20 |
| Titanium oxide | 4 | 3 |
| Polyethylene wax | 1.5 | — |
| Isocyanate mixture | 10 | — |

As is clear from Tables 1 through 3, the golf balls of the present invention exhibit excellent flight performance, controllability, feeling on impact, and durability against cracking. In contrast, the golf balls of Comparative Examples involve the following drawbacks.

COMPARATIVE EXAMPLE 1

Since the cover is thin, the golf ball exhibits poor durability when topped with an iron.

COMPARATIVE EXAMPLE 2

Since the cover is very thick, restitution of the golf ball is lowered, and the total distance is insufficient.

COMPARATIVE EXAMPLE 3

Since the hardness of the surface of the core is very high, the golf ball provides an unacceptably strong feeling on impact.

COMPARATIVE EXAMPLE 4

Since the cover is formed from an ionomer resin, the golf ball exhibits poor scuff resistance.

COMPARATIVE EXAMPLE 5

Since the hardness of the center of the core is very low, the golf ball provides an unacceptably dull feeling on impact, and durability against cracking caused by repeated hitting is poor.

COMPARATIVE EXAMPLE 6

Since the golf ball is a one-piece ball, restitution of the ball is low, and the total distance is excessively short.

COMPARATIVE EXAMPLE 7

Although the golf ball is a two-piece ball, controllability of the ball is poor (spin rate is low), since the cover is formed from a hard ionomer resin. In addition, the golf ball exhibits poor scuff resistance and durability against cracking.

As described above, the two-piece solid golf ball of the present invention provides an excellent feeling on impact and controllability (spin performance) satisfying advanced golfers and professional golfers, exhibits excellent cut resistance, scuff resistance, and durability against cracking caused by repeated hitting, and is suitable for use by advanced golfers on golf practice ranges.

So long as a practice golf ball provides advanced golfers and professional golfers with a distance sensation similar to that of a course ball, the total distance of the practice golf balls may be decreased to some extent. For a practice golf ball, reduction of the frequency of exchange, and durability (i.e., scuff resistance, durability against cracking caused by repeated hitting, and durability when topped with an iron) are important issues. The golf ball of the present invention exhibits controllability (spin performance) comparable to that of a course ball which is used by advanced golfers and professional golfers. Therefore, the golf ball of the present invention meets the requirements for a practice golf ball used by professional golfers and advanced golfers.

What is claimed is:

1. A two-piece solid golf ball comprising a solid core and an outer cover therefor, wherein the outer cover is formed from a cover-forming material consisting of components:

(A) a thermoplastic polyurethane material, and (B) an isocyanate mixture in which an isocyanate compound (b-1) having at least two isocyanate groups serving as functional groups in the molecule is dispersed in a thermoplastic resin (b-2) which is substantially non-reactive with the isocyanate groups;

the outer cover has a thickness of 2.15 to 2.9 mm and the outer cover has a JIS C hardness of 68 to 87;

the solid core is formed from a rubber material; and the solid core has a JIS C hardness as measured at any portion of the core is between 58 to 87, a JIS C hardness at a surface portion of the core is higher than a JIS C hardness at a center portion of the core, and a value obtained by subtracting the JIS C hardness at the center portion of the core from the JIS C hardness at the surface portion of the core is 20 or less.

2. A two-piece solid golf ball according to claim 1, wherein the solid core is formed from a rubber material containing an organic sulfur compound.

* * * * *